United States Patent Office 3,271,969
Patented Sept. 13, 1966

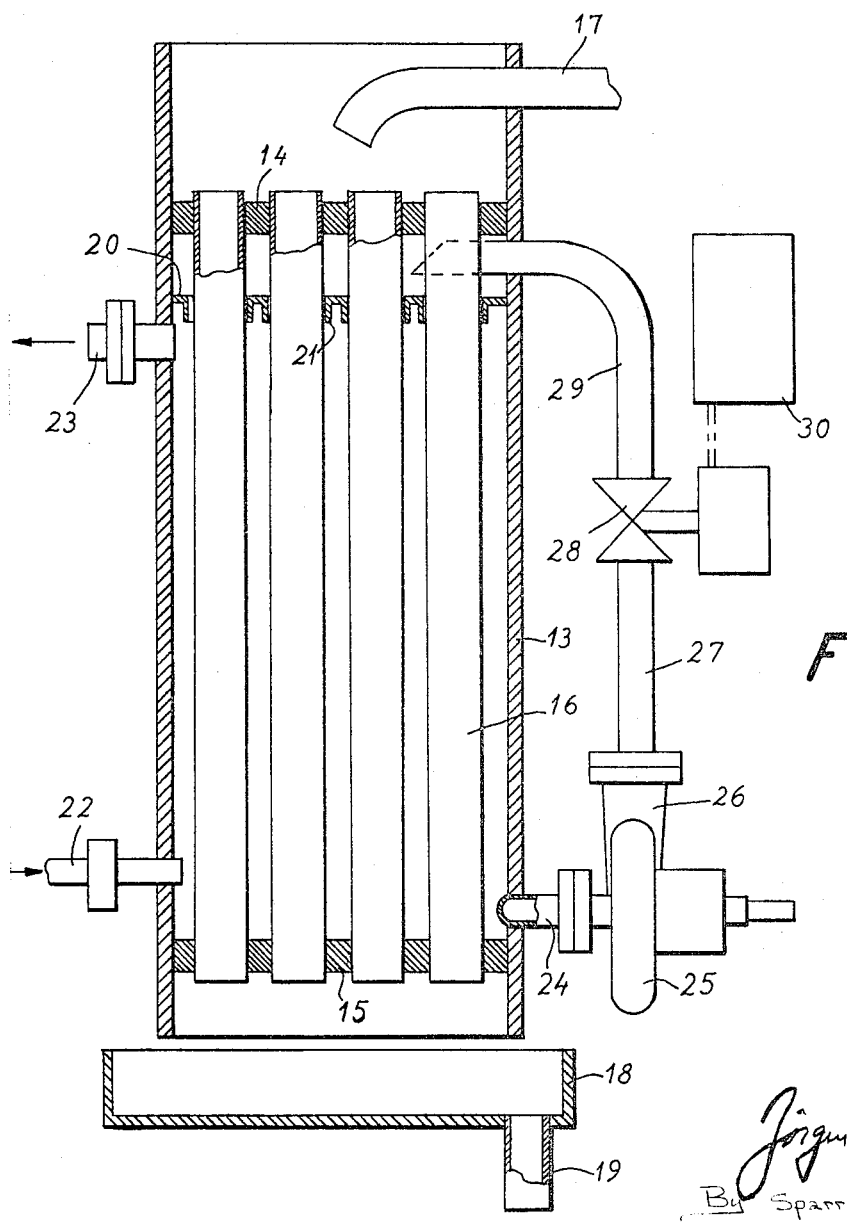

3,271,969
METHOD FOR FILM EVAPORATION AND AN EVAPORATOR FOR USING THE METHOD
Jørgen Lorentzen, Alfred Christensensvej 10, Naerum, Denmark
Filed Apr. 17, 1964, Ser. No. 360,565
Claims priority, application Denmark, Apr. 17, 1963, 1,777
5 Claims. (Cl. 62—98)

The useful effect of an evaporator is directly dependent on the heat transfer coefficients that can be attained between the evaporator wall and the media in question. It is known to attain a high heat transfer coefficient between the evaporator wall and the evaporating medium by letting the evaporating medium run down the evaporator surface as a thin film.

In a known method a rather great flow quantity is used and a turbulent flow in the liquid film results. Hereby the heat transfer coefficient will increase with increasing flow quantity.

In another known method a rather small flow quantity is used, and laminar flow in the liquid film results, and under these conditions the heat transfer coefficient will increase with decreasing flow quantity and thus with decreasing liquid film thickness.

Both these methods for attaining extremely high heat transfer coefficients have certain drawbacks, and therefore they have not been applied much in practice. A turbulent liquid film with a high heat transfer coefficient requires a great circulating quantity of liquid whereby great losses of pump work occur. A laminar liquid film with a high heat transfer coefficient requires a distribution of the liquid supply to all portions of the evaporation surface in such even manner that it can not be maintained by simple structural means. Both methods could, furthermore, only be used for rather special evaporator surface shapes.

The present invention provides means for remedying the above mentioned drawbacks and thereby for simpler use of film flow of the evaporating medium for attaining the high heat transfer coefficients which can be had under such conditions. The invention provides for obtaining film evaporation with a high average heat transfer coefficient in evaporator surfaces that are specially shaped for the use of film evaporation, and for means for using the advantageous film evaporation in connection with evaporator surfaces of a simpler configuration.

The basic idea of the invention is that a decreasing laminar liquid film can be obtained on an evaporator surface by interrupting the liquid supply and by letting the liquid freely drain from the surface. A rather thick running film, for instance 0.1–1.0 mm. thick, can be provided comparatively easily, for instance by means of per se known liquid distribution systems. When the liquid supply of such liquid film is discontinued, then the liquid which is in the film will move on under the influence of the gravity, of the liquid friction (viscosity), of the surface tension and of the adhesion. The result thereof is that in the first period after the interruption, for instance during 1 second, the film thickness decreases fast to a small value, for instance 0.1 mm., whereafter the film thickness will continue to decrease slowly so that in the ensuing period it will have such a value which gives the very great heat transfer coefficients. The film thickness will also decrease on account of the evaporation. Normally the length of the time period for the decreasing thin liquid film may be of the order of magnitude of 1–10 seconds.

The film thickness will, under these conditions, vary with the time, but also with the height of the wall as the film after the interruption first will dwindle at the top of the wall and thereafter successively downwards. In many instances the length of the time period which gives the best average for the whole wall height will correspond to that the film thickness will dwindle to zero at a certain portion of the wall height during a part of the full time period. Under such conditions the heat capacity of the wall will be of a special importance.

Even when the evaporating liquid contains matter in solution which can form incrustation on the evaporator surface the method according to the invention can be used as each period with a great film thickness provides for a rinsing of the surface.

With reference to the explanation given above the method according to the invention consists in that the liquid supply to each portion of the evaporator surface is subdivided with respect to time in such a manner that the liquid supply in each period is discontinued for such time that the film can decrease to a small thickness. It is obtained thereby that by means of a comparatively simple and inexpensive structure of the liquid distributing means a high heat transfer coefficient can be attained over a considerable part of the time so that the average heat transfer coefficient will be high.

The liquid supply may, according to the invention, be discontinued within each time period for such a time that a portion of the evaporator surface will become dry. During the time in which the said portion of the evaporator surface is dry, evaporation will not take place there but a certain amount of heat will be stored in the wall that will be used in the next period. This has the advantage that it combines the feature therewith that the heat supply to the wall, that is opposite the evaporation side, usually will be even so that, during the last part of the time in each period where the liquid supply is discontinued, it does not equal the heat transfer that takes place on the evaporation side with the very great heat transfer coefficient. For good utilization it will be advantageous that the heat capacity of the wall, according to the invention, is of the order of magnitude equal to or greater than the product of the average surface load and the interval time divided by the average temperature difference of the two sides of the wall.

The invention also relates to an evaporator for using the method, and it is the typical property of the evaporator according to the invention that it comprises means for periodically interrupting the flow of the liquid to each part of the evaporator surface.

The invention furthermore relates to various details which will be explained in the following description in connection with the drawings in which some embodiments of an evaporator according to the invention are being shown.

In the accompanying drawings:

FIGURE 1 shows a vertical section of an evaporator,
FIGURE 2 shows a timing diagram for a pulsator for the evaporator.

The evaporator shown in FIG. 1 has a container 13 with two horizontal transverse walls 14 and 15, in which a number of vertical pipes 16 are inserted which are open on both ends. Over the upper wall 14 a pipe 17 discharges, which serves for supplying of a liquid, which is to be cooled. The liquid flows down through pipes 16 and is collected in a container 18, placed beneath the container 13 having an outlet 19.

In the container 13 a transverse wall 20 is arranged at a distance below wall 14, having holes for the pipes 16. Each of the holes has a downward pointing cylindrical collar 21, the inner diameter of which is a little larger than the outer diameter of the pipe. On the side of container 13 a supply pipe 22 for liquid cooling medium is connected near the bottom, and an outlet pipe 23 for cooling medium vapor is arranged near the top. On side of the container 13 near the bottom thereof a pipe 24 is connected to the intake of a centrifugal pump 25, the outlet 26 of which is connected to a pipe 27, which comprises a valve 28 and is connected with a pipe 29, which extends into container 13 between the two walls 14 and 20. Valve 28 is controlled by a pulsator 30. When valve 28 is opened by pulsator 30, cooling medium will flow into the space between walls 14 and 20 and will form a layer on wall 20. Immediately there will be a flow of liquid through the slots between pipes 16 and collars 21 and further down the outside of pipes 16. When valve 28 after a certain short period of time is closed again, the space above the wall 20 is quickly emptied. Immediately after that has taken place a substantially smooth film of cooling medium will be present on the outside of the pipes 16. This film has a rather great thickness. However, the liquid cooling medium of the film will flow down by gravity, and the film thickness will therefore quickly decrease at the top. The small thickness will thereafter extend relatively fast downwardly. The film will evaporate by which the thickness is further diminished. After some time valve 28 is opened again, and so on. The length of the period may be so adjusted that a smaller or a larger part of the surface of pipes 16 will get dry. In each period preferably such a quantity of cooling medium is supplied through pipe 29 that a surplus quantity will flow along the pipes 16 down into container 13, since thereby the best mode is ascertained that the pipes are coated uniformly. The pulsator is preferably adjustable, so that the length of the period can be adapted to the conditions of operation, e.g. to the temperature of the liquid which is supplied through pipe 17.

Relating to the determination of the length of the period the following can be stated:

A stationary laminary liquid film which is running down a vertical wall under the influence of the gravity and the liquid friction (viscosity forces) will according to calculation have a film thickness of $$C_o \left( \frac{3 \cdot G_s \cdot \eta}{j^2} \right)^{1/3} \quad (1)$$

where $C_o$ = the film thickness in m.
$G_s$ = the liquid flow in kg./s. pr. m. wall width
$\eta$ = dynamic viscosity in kg. s./m.$^2$
$j$ = specific gravity in kg./m.$^3$ If at the time $t=0$ at a certain level on the wall the further liquid supply to this film is interrupted it will not be maintained as a stationary film; but by the continued liquid movement under the influence of the gravity and of the viscosity forces the film thickness will gradually decrease at a lower level and first at levels closest below the point where the liquid supply has been interrupted.

It can be shown mathematically that the film thickness $e$ by a good approximation at any time $t$ after the interruption and at any level $h$ below the interruption level will be given by $$e = \sqrt{\frac{1}{\frac{1}{C_o^2} + \frac{2j}{3\eta \cdot h} \cdot t}} \quad (2)$$

when $h$ is in meters and $t$ in seconds and the other values as given by the Equation 1.

It appears therefrom that the film thickness in each point of the evaporation surface will decrease relatively fast at first and thereafter substantially slower. This makes the practical application of the method according to the invention for attaining a high heat transfer coefficient possible since each point of the evaporation surface will be covered by an extremely thin film during a relatively long time so that the heat transfer improvement which is dependent hereon can be obtained for a relatively long time.

The surface tension will, to a certain degree, increase the effect of the molecular forces since the material of the wall of the evaporator usually is such that it is wetted by the liquid which is evaporating, therefore providing greater forces for securing the last thin film layer to the wall than the viscosity forces alone.

The evaporation of liquid from the film will give a contrary effect, as since the film thickness will decrease corresponding to the evaporated quantity of liquid. This effect alone can be calculated in a simple manner, since $$\frac{de}{dt} = \frac{q}{j\rho}$$

where $de/dt$ is the decrease of the thickness of the film in m./s.
$q$ is the surface load of the evaporator in kcal./m.$^2$/s.
$j$ is specific weight of the liquid in kg./m.$^3$, and
$\rho$ is heat of evaporation of the liquid in wcal./kg.

Under the usual conditions in technical evaporators this evaporating rate of decrease will not be high enough for leaving sufficient time with the favorable value of the film thickness.

The combined effect of Equation 2 and Equation 3 can be determined graphically by which a basis is obtained for determining the suitable length of the time interval, for example dependent on the shape of the evaporator and on the evaporating medium.

The pulsator for the embodiments shown in FIG. 1 may have a program as indicated in FIG. 2 where valve 28 in each period is closed for four seconds and is open for one second. During the period of opening such a quantity of liquid is supplied to the top of the evaporator surface that normal distributing members may be used which are simple and inexpensive in structure and which ensure a continuous film of the liquid over the entire surface. Similar conditions exist with respect to the embodiment in FIG. 1, that is for each vertical strip on the inner side of the drum.

The embodiment shown and described is only to be considered as examples, since various modifications within the scope of the invention may be imagined. Thus, it could be possible to provide the initial film by spraying an evaporating liquid on tubes. In such case the tubes would be arranged in such manner that the liquid may run from the upper tubes down on tubes positioned below. It also might be possible to apply the initial film by means of scraping members whereby in some instances a comparatively thin initial film may be obtained. Corrugation of the evaporation surface may perhaps also be advantageous when it can be achieved by means of the corrugation that a substantial portion of the initial film will be drawn to special places, for example to grooves. Where the evaporation surface will be very high, it may be advantageous to subdivide it by means of horizontal drain grooves or of obliquely arranged grooves.

It also will be possible to use the invention with entirely horizontal evaporation surfaces. Thereby an entirely even or uniform film with considerable thickness may be applied, or the liquid may be applied unevenly and will thereafter be distributed by flowing out from the feeding lines.

When a part of the evaporation surface is allowed to dry out as stated above, it should be endeavoured to supply the next amount of liquid at such time when the average heat transfer from the evaporation surface in question (that is from the dry and from the moist portion) will become smaller than by a complete covering with a rather thick film, or perhaps a little earlier when the greatest possible average heat transfer for the surface can be attained.

What I claim is:

1. In a method for liquid film evaporation wherein cooling liquid is directed through automatic pulsating valve means to an evaporator surface, the steps of:

(a) directing a flow of said liquid through said automatic pulsating valve means to said evaporator surface to wet the same;

(b) discontinuing the flow of said liquid through said automatic pulsating valve means to said evaporator surface for a short preselected period of time;

(c) recommencing directing a flow of said liquid through said automatic pulsating valve means to said evaporator surface while at least a portion thereof is still wet whereby the cooling effect of said fluid on said surface is increased relative to the cooling effect of a continuous flow of said fluid.

2. In a method of liquid evaporation according to claim 1, wherein the recommencement of said flow of said liquid is caused while another portion of said surface is dry.

3. An evaporator for evaporating a liquid film, said evaporator comprising:

(a) a plurality of vertical conduit means having upper and lower regions;

(b) means for directing a flow of evaporating liquid about said upper region of said conduit means;

(c) means for removing the flow from said lower region of said conduit means;

(d) and automatically pulsating valve means for automatically and periodically discontinuing the flow of the evaporating liquid about said upper region of said conduit means and for automatically recommencing said flow while a portion of said flow remains at least about the lower region of said conduit means.

4. An evaporator for a cooling medium, comprising a vertical container, an upper and a lower horizontal wall in said container, a plurality of vertically arranged tubes tightly sealed in said walls, an intermediate horizontal wall at a substantially short distance below said upper wall, said intermediate wall having a plurality of holes, said holes being of substantially larger diameter than the outside diameter of said tubes for permitting said tubes to pass freely through said holes, collars at said holes on the lower face of said intermediate wall, a conduit for said cooling medium, said conduit terminating between said upper and said intermediate walls, a feed pipe line admitting said cooling medium to said container, an exhaust pipe line on said container for ventilating the vapors of said cooling medium, pump means in said conduit for recirculating at least a part of said cooling medium, said pump means having an intake orifice connected with said container, shut-off means in said conduit, and automatic operated pulsator means controlling said shut-off means for periodically admitting and interrupting the flow of said cooling medium to the interspace between said upper and said intermediate walls.

5. An evaporator for a cooling medium according to claim 4, and said automatic operated pulsator means having an adjustable timer for varying the periods of said admitting and interrupting of the flow of said cooling medium.

References Cited by the Examiner

UNITED STATES PATENTS

| | | | |
|---|---|---|---|
| 1,631,162 | 6/1927 | Sebald | 165—115 X |
| 2,254,070 | 8/1941 | Jacocks | 165—108 X |
| 2,267,568 | 12/1941 | Kleucker | 165—115 X |
| 2,867,990 | 1/1959 | Cary | 62—171 |
| 2,906,103 | 9/1959 | Saltzman | 62—171 X |
| 2,918,925 | 12/1959 | Dopler | 165—108 X |
| 2,988,898 | 6/1961 | Hesson et al. | 62—171 X |
| 3,099,607 | 7/1963 | Lustenader et al. | 165—108 X |

LLOYD L. KING, *Primary Examiner.*

MEYER PERLIN, *Examiner.*

ROBERT A. O'LEARY, *Assistant Examiner.*